United States Patent [19]

Mullane et al.

[11] 4,190,388
[45] Feb. 26, 1980

[54] SINGLE-POINT CUTTING TOOL

[76] Inventors: George W. Mullane; Earl K. Harrison, both of 10928 Lucerne, Houston, Tex. 77016

[21] Appl. No.: 911,744

[22] Filed: Jun. 2, 1978

[51] Int. Cl.² .................... B23B 27/16; B23B 29/02
[52] U.S. Cl. .................................. 408/188; 408/197; 408/199
[58] Field of Search ............... 408/188, 186, 197, 198, 408/199, 146, 239 R, 713; 407/46, 48, 101, 104

[56] References Cited

U.S. PATENT DOCUMENTS

| Re. 28,389 | 4/1975 | Melinder | 407/104 |
|---|---|---|---|
| 266,440 | 10/1882 | Decker | 408/186 |
| 1,201,673 | 10/1916 | Amborn | 408/198 |
| 3,015,241 | 1/1962 | Konwal | 408/199 |
| 3,274,862 | 9/1966 | Babich et al. | 407/46 X |

FOREIGN PATENT DOCUMENTS 977537 11/1975 Canada ........................... 408/197

*Primary Examiner*—Leonidas Vlachos
*Attorney, Agent, or Firm*—Sughrue, Rothwell, Mion, Zinn and Macpeak

[57] ABSTRACT

A single-point metal machining cutting tool takes the form of an elongated bar whose opposed ends are provided with transverse flat bottom, flat wall grooves intersecting the axis of the bar. Tip holders of complementary flat wall configuration may be mounted within the grooves, held in position by a screw passing through the tip holder at its center and received within a tapped and threaded axial hole within the ends of the cutting tool bar. Shear forces during cutting are not transmitted from the tip holder to the bar through the screw, strain on the screw is eliminated, and the ability of the bar to withstand torque during cutting is maximized by the axial location of a single screw hole at each end.

2 Claims, 3 Drawing Figures

SINGLE-POINT CUTTING TOOL

FIELD OF THE INVENTION

This invention relates to turning tools for use in metal machining, and more particularly, to an improved, single-point cutting tool which minimizes torque transmission to the tip holder and its means of mounting to the cutting tool bar.

BACKGROUND OF THE INVENTION

Turning is the machine shop operation that generates an exterior surface, circular in its transverse cross-section on workpieces that rotate about an axis. Turning is usually performed with a single point tool.

The corresponding operation that generates an interior surface is called "boring"; that is, boring constitues internal turning. Either the workpiece or the single-point cutting tool may rotate about an axis to enlarge in size a hole that was originated previously by coring, flame-cutting, drilling, or other methods. The single-point cutting tool can also be used to thread either interior or exterior surfaces on a workpiece. Conventionally, lathes and boring or turning mills employ single-point cutting tools.

One of the most commonly employed single-point cutting tools consists of: a bar, normally round in its cross-section, one of whose ends can be mounted on a chuck or other suitable gripping device (the slave end), and whose other end (the free end) is shaped to accept a tip holder; a tip holder, constituting a device shaped for mounting on the free end of the bar, and having provisions for accepting and mounting a cutting tip; and the cutting tip.

The cutting tips commercially available today have been largely standardized in design by their various manufacturers for convenience of interchangeability. Thus, most cutting tips are flat, triangular in shape, and include a hole through their center. A cam screw is passed through the tip holder, and an eccentric extension pin passes through the hole in the cutting tip and the cutting tip is pressed into contact with a recess surface of the tip holder by rotation of the screw with shifting of the eccentric acting to fasten and fix the cutting tip firmly with respect to the tip holder and in contact with the tip holder surface.

On the other hand, the bar and tip holder combination is available in a great variety of designs. For example, the bar and tip holder may be respectively beveled, lipped, notched or otherwise designed so that a portion of their surfaces mate closely.

However, all presently known designs include certain common features. Both the bar and tip holder have screw holes which become aligned when the tip holder is in its proper position on the bar; securing screws are then passed through the aligned holes, and the securing screws are tightened to fasten and fix the tip holder firmly on the bar. Also, all such designs have at least one of the securing screws (and, consequently, its hole) oriented radially along the bar transverse cross-section.

The main disadvantage of having radially oriented securing screws is that the resolution of the forces acting upon the tool is unsatisfactory. The tangential force acting against the cutting tip during operation is transmitted as stress through the tip holder, to the securing screws as stain and shear forces, and to the bar as torque. Whereas, the tip holder is usually of a material hard enough to withstand the stress, the strain on the securing screws can elongate the securing screws or deform their threads (thus deforming the thread of its hole through the tip holder and/or—more likely—the thread of its hole through the bar). The shear force on a securing screw can eventually break the screw or, even worse, cause the screw hole to widen inside the bar. If the bar is thus weakened, it will likely succumb to the torque and deform or twist. If larger-diameter securing screws are employed in order to increase their resistance to strain and shear, their correspondingly larger-diameter screw holes reduce the cross-section of the bar and the bar becomes more susceptible to deformation or twisting by the torque.

Another disadvantage of the conventional design is that only one end of the bar can serve as its free end. Radially oriented screws require a very tight mating of the surfaces of the bar and the tip holder in order to align the securing screw holes. Since the slave end of the bar is gripped by pressure in the jaws of, for instance, a chuck, there is a great likelihood of damage to the surface on the slave end of the bar, and consequently there is a great likelihood that the securing screw holes may become misaligned. Thus, it is impractical to design both ends of the bar to serve as free ends capable of accepting a tip holder.

Attempts have been made to manufacture single-point cutting tools which eliminate the tip holder by incorporating its function in the bar. In other words, the bar itself has provisions for accepting a cutting tip. While this design avoids the problems created by radially oriented securing screws, it is impractical because it requires the bar then to be made of a material hard enough to withstand the concentrated stress acting on the surface supporting the cutting tip.

It is, therefore, a primary object of the present invention to provide an improved single-point cutting tool which eliminates the transmission of forces generated during use through the securing screw and to eliminate the strain and the shear force acting on the screw.

It is a further object of the present invention to provide an improved single-point cutting tool in which the screw hole for the tip holder securing screw is provided with respect to the bar so as to minimize the capability of the bar to withstand applied torque during cutting.

SUMMARY OF THE INVENTION

The present invention takes the form of a single-point cutting tool including an elongated bar having opposed ends, with at least one of the ends including a transverse, flat walled groove intersecting the axis of the bar and a tip holder of complementary flat wall configuration slidably mounted within the groove with one wall in contact with the bottom wall of the groove. The bar is tapped and threaded axially at said one end within the groove bottom-wall and the tip holder is bored at right angles to its wall which contacts the bottom wall of the groove and bears a securing screw which extends through the tip holder and is received within the tapped and threaded hole of the cutting tool bar. A cutting tip is mounted to one end of the holder and projects laterally to one side of the bar such that the forces during cutting are not transmitted from the tip holder to the bar through the screw, strain on the screw is eliminated, as well as the transmission of shear forces to the screw, and the ability of the bar to withstand torque is enhanced by the axial location of the single screw hole.

Preferably, the tip holder is of trapezoidal configuration in the plane parallel to the transverse groove, and the end of the bar at least to one side is beveled at right angles to the groove axis. The tip is mounted to the tip holder adjacent a sidewall which inclines outwardly in a direction away from the face of the tip holder contacting the bottom of the groove to minimize the effect of accumulated cuttings on the operation of the cutting tool during cutting. The hole within the tip holder passes through its center and may comprise a bore and counterbore from its outer end face inwardly, with the securing screw having an enlarged head received within the counterbore and with the end of the screw head being essentially flush with the end face of the tip holder remote from the bottom of the groove.

DESCRIPTION OF THE PREFERRED EMBODIMENT

Figure 1:
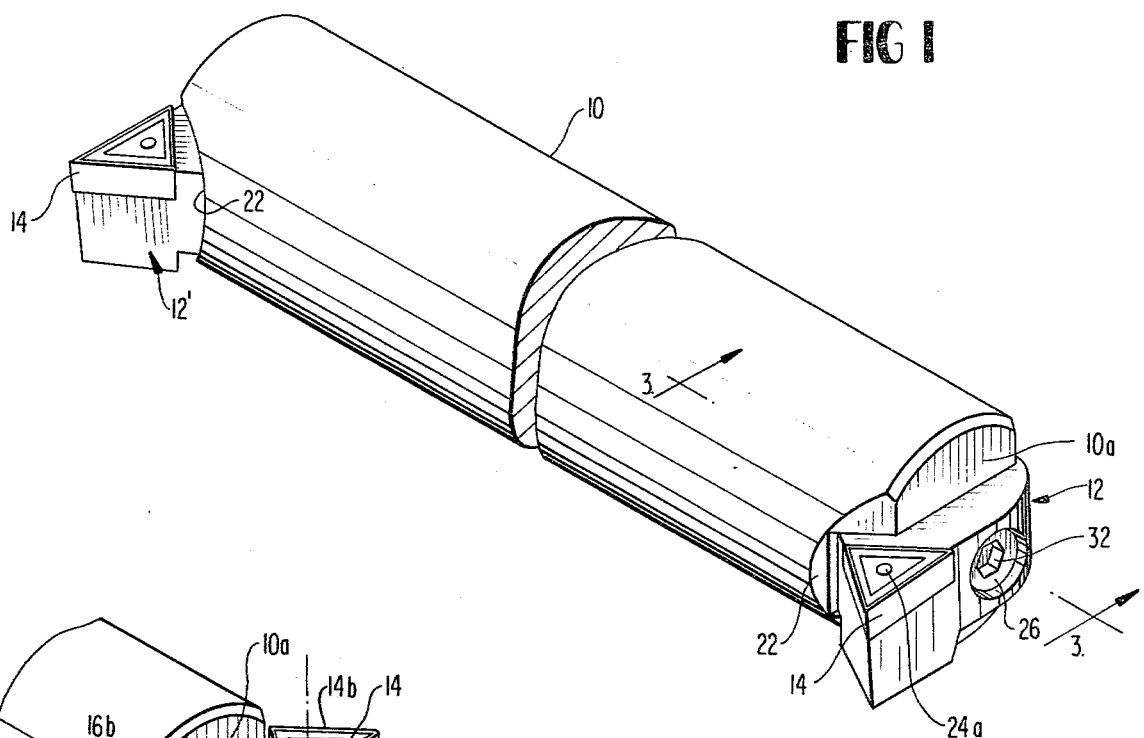
FIG. 1 is a broken, perspective view of a double ended, improved single-point cutting tool of the present invention in one form.

Referring to the drawings, the single-point cutting tool of the present invention, in one form constitutes three main components: a bar 10, a cutting tool tip holder indicated generally at 12 or 12', and a conventional triangular shaped cutting tool tip 14. The arrangement in FIG. 1 shows cutting tool tip holders and tips located at both ends of the bar 10. However, in actual practice, a tip holder and tip are mounted to one end of the bar (the free end), while the other end of the bar is absent a tip holder and tip and constitutes the slave end which is receivable within a chuck or other suitable gripping device. In FIG. 1, the tip holders and tips are provided at both ends only to illustrate that by reversing the ends of the bar 10, both ends may be employed to support tip holders and cutting tips. Further, in the design of the present invention, the bar and tip holder combination permits the bar to accept both right hand and left hand tip holders, as at 12 and 12' respectively, as desired. In FIG. 1, the tip holder 12 is a right hand tip holder, while tip holder 12' at the opposite end of the bar is a left hand tip holder.

Figure 2:
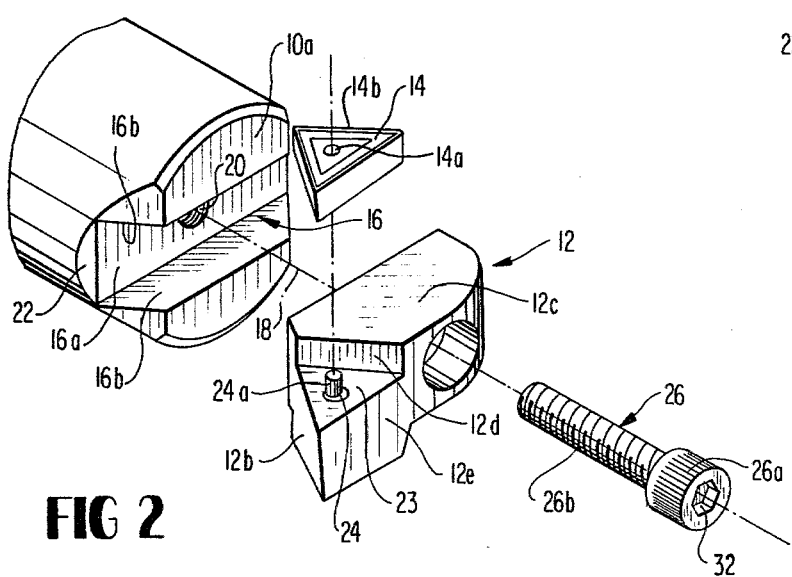
FIG. 2 is an exploded, perspective view of one end of the cutting tool of FIG. 1, showing the method of mounting the tip to the tip holder and the tip holder to the cutting tool bar.
Figure 3:
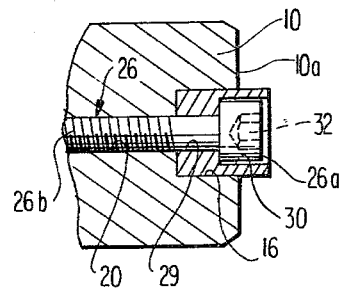
FIG. 3 is a sectional view of the portion of the cutting tool of FIG. 1 taken about line III—III.

Each end of the bar 10 is provided with a flat-bottom, flat walled channel or groove 16 which extends across the end of the bar and is centered with respect to the axis 18 of the bar, FIG. 2. Each end face 10a of the bar is flat, and each channel or groove 16 is formed with a flat bottom wall 16a and flat opposed sidewalls 16b. In the configuration shown, the groove or channel 16 is of rectangular cross-sectional configuration. The cutting tool bar 10 is tapped and provided with an axial threaded hole at 20, at each end. Thus, the tapped and threaded hole 20 is central with respect to its channel 16. Each tip holder 12 or 12' is designed to fit snugly into its channel 16 with a large area of contact between the tip holder and the bar. For instance, the tip holder 12 is of generally trapezoidal cross-section in the plane parallel to the longitudinal plane of the groove or channel 16 and is provided with a flat inner end wall 12a, an inclined end wall 12b which is inclined outwardly with respect to axis 18 in a direction away from the inner end wall 12a. Further, the sides of the bar 10, which preferably is of circular cross-section, are beveled at each end, as at 22 in the vicinity of the groove or channel 16, with the beveled wall 22 forming an opposing flared surface with respect to the inclined wall 12b of the tip holder when a tip holder is located within its receiving channel 16 at an end of the cutting tool bar 10. A triangular shaped recess 23 is formed within the tip holder sidewall 12c to one transverse side of the assembly defining tip abutment or locating surface 12d, receiving the triangular shaped tip 14 of conventional construction. The tip 14 is provided with a hole 14a which receives the eccentric portion or pin 24a of a mounting screw 24 which is threadably mounted to the tip holder with the eccentric portion 24a projecting outwardly of the recess 23 and being received within the hole 14a. Thus, conventionally, by rotating the mounting screw 24 about its axis, the eccentric pin 24a shifts to force one of the triangular sidewalls as at 14b against the recess sidewall 12d of the tip holder 12, constituting a locating surface for the tip 14. The tip holder 12 is provided with an outer end wall as at 12e, opposite inner end wall 12a and remote from the bottom-wall 16a of the channel 16. A securing screw indicated generally at 16 is mounted to tip holder 12. The securing screw 26 is provided with an enlarged diameter head 26a and a threaded shaft portion 26b, the screw being carried by the tip holder. The tip holder is bored at 28 and counterbored as at 30 with the counterbore 30 receiving the head portion 26a of the screw 26, the shaft portion 26b projecting through the bore 28 and being threadably received within the threaded hole 20 of the cutting tool bar 10, FIG. 2.

The surface of the screw head 26a is shown as being knurled, and further, the head end is provided with a hexagonal shaped recess 32 which receives an appropriate tool for screwing the screw 26 into position and locking the tip holder within groove or channel 16 to bar 10. The tip holder 12 is bored and counterbored at its center, that is, essentially intermediate of opposed transverse sides. As may be appreciated by viewing the figures, the tip holder 12 being designed to fit snugly into the channel 16 with large areas of contact between the tip holder 12 and bar 10. The opposed flat sidewalls 16b of groove 16 bear on the opposed sidewalls 12c of the tip holder 12, with this area of contact distributing and minimizing the torque acting on the bar upon cutting by the cutting tip of the workpiece. By transmitting the forces through these contact surfaces rather than through the securing screw 26, the securing screw 26 is relieved of shear stress. Further, in the instant invention, the channel 16 on the free end of the bar does not require the careful alignment of radially-oriented securing screw holes. Therefore, the machining tolerances between the bar and tip holder are much more liberal than in conventional designs.

Further, the opposite end of the tool holder bar 10 not holding the tip holder and tip can better withstand being gripped by pressure within the jaws of the chuck or like assembly without its losing its capacity to accomodate a tip holder such as 12 or 12' when the ends are reversed. The bar is open ended, both of its ends are constructed to serve as a free end so that the useful life of the bar is effectively doubled. With the bar accepting both a right hand 12 and a left hand 12' tip holder, the versatility of the cutting tool is enhanced, and the tip holder is designed to accept conventional, standardized cutting tips such as the triangular shaped tips 14 as shown. The oppositely beveled or inclined surfaces 22 and 12b for the bar 10 and tip holder 12 respectively, form effective clearances for the cutting to prevent the cuttings from interfereing with the workpiece in its removing metal during cutting operation.

While the invention has been particularly shown and described with reference to a preferred embodiment thereof, it will be understood by those skilled in the art that various changes in form and details may be made therein without departing from the spirit and scope of the invention.

What is claimed is:

1. A single point cutting tool comprising:
   an elongated bar having opposed ends,
   at least one end including a transverse flat walled groove including a flat bottom-wall and flat sidewalls intersecting the axis of said bar,
   a tip holder of complementary flat wall configuration slidably mounted within said groove with one wall in contact with the bottom-wall of said groove,
   said bar being tapped and threaded axially at said one end, within said groove bottom-wall,
   said tip holder being bored at right angles to its wall contacting the bottom-wall of said groove,
   a cutting tip mounted to one end of said holder and projecting laterally to one side of said bar,
   a securing screw carried by said tip holder, passing through said groove and being threaded to said elongated bar at its axis to lock said holder to the groove end of said bar,
   and wherein said tip holder is of trapezoidal configuration in a plane parallel to said transverse groove, and the end of at least one side of said bar, at right angles to the groove axis, is beveled towards said bar end, said tip is mounted to the tip holder adjacent the sidewall which is inclined outwardly in a direction away from the face of said tip holder contacting the bottom of said groove and acts in conjunction with said beveled side of said bar so as to minimize the effect of accumulated cuttings on the operation of the cutting tool during cutting; and
   whereby, the forces during cutting are not transmitted from said tip holder to said bar through said screw, eliminating strain on the screw and shear force transmission to the screw, and the ability of the bar to withstand torque during cutting is maximized by the axial location of the single screw hole.

2. The single-point cutting tool as claimed in claim 1, wherein a hole passes through the center of said tip holder, said hole comprises a bore and counterbore and said securing screw comprises a headed screw with the head received within the counterbore to the side of said tip holder opposite the wall facing said groove bottom-wall such that the end of said head is essentially flush with the end face of said tip holder remote from the bottom of said groove.

* * * * *